(12) United States Patent
Junod et al.

(10) Patent No.: US 8,548,167 B2
(45) Date of Patent: Oct. 1, 2013

(54) SYSTEM FOR TRACEABLE DECRYPTION OF BANDWIDTH-EFFICIENT BROADCAST OF ENCRYPTED MESSAGES AND SECURITY MODULE REVOCATION METHOD USED FOR SECURING BROADCASTED MESSAGES

(75) Inventors: Pascal Junod, Vufflens-la-Ville (CH); Alexandre Karlov, Meyrin (CH); Nicolas Fischer, Versoix (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 1206 days.

(21) Appl. No.: 12/382,354

(22) Filed: Mar. 13, 2009

(65) Prior Publication Data

US 2009/0208010 A1 Aug. 20, 2009

Related U.S. Application Data

(63) Continuation-in-part of application No. 11/882,504, filed on Aug. 2, 2007, now Pat. No. 7,831,045.

(30) Foreign Application Priority Data

Aug. 17, 2006 (EP) .................................... 06119127

(51) Int. Cl.
*H04N 7/167* (2011.01)
*H04L 9/20* (2006.01)
*H04L 9/08* (2006.01)

(52) U.S. Cl.
USPC ............. 380/239; 380/28; 380/211; 380/228; 713/163; 713/168

(58) Field of Classification Search
USPC ........................................................ 380/239
See application file for complete search history.

(56) References Cited

U.S. PATENT DOCUMENTS 4,423,287 A * 12/1983 Zeidler ........................... 705/71
4,578,530 A * 3/1986 Zeidler ........................... 705/71

(Continued)

FOREIGN PATENT DOCUMENTS

EP          1 501 237          1/2005
GB          2419262 A          4/2006
WO          WO 01/56287 A2     8/2001

OTHER PUBLICATIONS

NPL: "An Efficient Public Key Traitor Tracing Scheme. CRYPTO 1999: 338-353)."*

(Continued)

*Primary Examiner* — Luu Pham
*Assistant Examiner* — Yonas Bayou
(74) *Attorney, Agent, or Firm* — Harness, Dickey & Pierce, P.L.C.

(57) ABSTRACT

The present invention makes use of techniques such as those described by Boneh and Franklin to allow for the realization of a pseudo-asymmetric encryption scheme whereby one public encryption corresponds to a plurality of private decryption keys. This scheme therefore provides a solution to the problem of inefficient use of bandwidth in asymmetrical encryption schemes which inherently require that a plurality of encryptions of data be broadcast to a plurality of receivers. The invention further ensures that the advantage of traceability, typical found in asymmetric encryption schemes, is maintained due to the characteristic that each receiver uses a unique traceable decryption key. The traceability thus achieved by the present invention allows for the revocation of a security module which has been involved in the abusive use of conditional access data, particularly by means of clones of security modules whose security has been compromised.

22 Claims, 4 Drawing Sheets

(56) References Cited

U.S. PATENT DOCUMENTS

| | | | |
|---|---|---|---|
| 7,634,087 B2* | 12/2009 | Boneh et al. | 380/28 |
| 7,831,045 B2* | 11/2010 | Junod | 380/228 |
| 2002/0133701 A1* | 9/2002 | Lotspiech et al. | 713/163 |
| 2004/0114762 A1 | 6/2004 | Medvinsky | |
| 2004/0120529 A1 | 6/2004 | Zhang et al. | |
| 2004/0268408 A1* | 12/2004 | Lee et al. | 725/116 |
| 2006/0085637 A1* | 4/2006 | Pinkas | 713/168 |
| 2007/0256138 A1* | 11/2007 | Gadea et al. | 726/26 |
| 2008/0044019 A1* | 2/2008 | Junod | 380/228 |
| 2008/0170687 A1* | 7/2008 | Moors et al. | 380/200 |
| 2009/0086970 A1* | 4/2009 | Kahn | 380/211 |
| 2009/0185676 A1* | 7/2009 | Junod et al. | 380/28 |
| 2009/0238363 A1* | 9/2009 | Tronel et al. | 380/239 |

OTHER PUBLICATIONS

Boner D et al: "An Efficient Public Key Traitor Tracing Scheme" Advences in Cryptology. Crypto '99. 19th Annual International Cryptology Conference. Santa Barbara, CA, Aug. 15-19, 1999. Proceedings, Lecture Notes in Computer Science; vol. 1666, Berlin: Springer, DE, Aug. 15, 1999, pp. 338-353, XP001194953 ISBN:3-540-66347-9.

Halevy D et al: "The LSD Broadcast Encryption Scheme" Lecture Notes in Computer Science, Springer Verlag, Berlin, DE, vol. 2442, 2002, pp. 47-60, XP002279256 ISSN: 0302-9743.

Naor D et al: "Revocation and Tracing Schemes for Stateless Receivers" Internet Citation, [Online] Jul. 2001, XP002203174 Extrait de l'Internet: URL:http://eprint.iacr.org/2001/059.pdf> [extrait le Jul. 24, 2002].

European Search Report Dated Jan. 23, 2007.

* cited by examiner

| KGrA | KGrB | KGrC | KGrD | KGrE |
|------|------|------|------|------|
| SC1A | SC1B | SC1C | SC1D | SC1E |
| SC2A | SC2B | SC2C | SC2D | SC2E |
| SC3A | SC3B | SC3C | SC3D | SC3E |

Fig. 8

| KGrA | KGrB | KGrC | KGrD | KGrE |
|------|------|------|------|------|
| SC1A | SC1B | SC1C | SC1D | SC1E |
|      | SC2B | SC2C | SC2D | SC2E |
|      | SC3B | SC3C | SC3D | SC3E |
|      | SC2A |      | SC3A |      |

Fig. 9

SYSTEM FOR TRACEABLE DECRYPTION OF BANDWIDTH-EFFICIENT BROADCAST OF ENCRYPTED MESSAGES AND SECURITY MODULE REVOCATION METHOD USED FOR SECURING BROADCASTED MESSAGES

This is a continuation-in-part application of application Ser. No. 11/882,504, filed Aug. 2, 2007 now U.S. Pat. No. 7,831,045, which claims priority under 35 U.S.C. §119 to European Patent Application No. 06119127.6, filed Aug. 17, 2006, in the European Patent Office, the entire contents of each of which are herein incorporated by reference.

INTRODUCTION

The present invention relates to the field of the security of security modules, these modules being intended to contain personal data and secrets that allow access to services or performances.

This invention applies more precisely to the Pay-TV field, in which a content is broadcasted in the enciphered form, the deciphering of this content being authorised in determined conditions.

STATE OF THE ART

In a well-known way, in order to be able to view a Pay-TV event, such as a film, a sports event or a game in particular, several streams are broadcast to a multimedia unit, for example, a decoder. In particular, these streams are on one hand the file of the event in the form of an enciphered data stream and on the other hand a stream of control messages allowing for the deciphering of the data stream. The content of the data stream is enciphered by "control words" (Control words=cw) that are regularly renewed. The second stream is called the ECM stream (Entitlement Control Message) and can be formed in two different ways. According to a first method, the control words are enciphered by a key, called a transmission key TK, which generally pertains to the transmission system between the management centre and a security module associated with the receiver/decoder. The control word is obtained by deciphering the control messages by means of the transmission key TK.

According to a second method, the ECM stream does not directly contain the enciphered control words, but rather contains information allowing the control words to be determined. This determination of the control words can be carried out by means of different operations, in particular by decryption, this decryption can lead directly to the control word, which corresponds to the first method described above, but the decryption can also lead to an item of data which contains the control word, which must then be extracted from the piece of data. In particular, the data can contain the control word as well as a value associated with the content to be broadcasted, and in particular the access conditions to this content. Another operation allowing the determination of the control word can use, for example, a one-way hashing function of this information in particular.

In a way well known to those skilled in the art, the security module can essentially be produced according to four different forms. One of these is a microprocessor card, a smart card, or more generally an electronic module (taking the form of a key, a badge, . . . ). This type of module is generally removable and can be connected to the decoder. The form with electric contacts is the most widely used, but a connection without contacts is not excluded, for example of the ISO 14443 type.

A second known form is that of an integrated circuit shell placed, generally in an irremovable and definitive way, in the decoder shell. One variant is made up of a circuit mounted on a base or a connector such as an SIM module connector.

In a third form, the security module is integrated into an integrated circuit shell also having another function, for example in a descrambling module of the decoder or the microprocessor of the decoder.

In a fourth embodiment, the security module does not take a material form, but rather its function is only implemented in the form of software. Given that in the four cases, although the security level differs, the function is identical, it concerns a security module regardless of the way in which it carries out its function or the form that this module may take.

At the time of the deciphering of a control message (ECM), it is verified, in the security module, that the right to access the content in question is present. This right can be managed by authorisation messages (EMM=Entitlement Management Message) that load such a right into the security module.

The broadcasting of conditional access digital data is schematically divided into three modules. The first module is responsible for the enciphering of the digital data by control words cw and the broadcasting of this data.

The second module prepares the control messages ECM containing the control words cw, as well as the access conditions and broadcasts them for the users.

The third module prepares and transmits the authorisation messages EMM that are responsible for defining the reception rights in the security modules connected to the receivers.

While the first two modules are generally independent of the recipients, the third module manages the set of users and broadcasts data for a user, a group of users or all the users.

One of the methods for bypassing security, which is certainly difficult but feasible, consists in analysing the content of an authorised security module (reverse engineering) in order to imitate the security part (deciphering of the messages) by short-circuiting the verification part of the rights. It is thus possible to produce a "clone" of a genuine security module. Such a clone will therefore dispose of the transmission key that will allow the deciphering of the control words cw contained in the control messages ECM. As the rights are not verified in this clone, it will function as the original with respect to the deciphering means without therefore needing to dispose of the rights to carry out this deciphering.

In a Pay-TV system, it is possible to change the transmission key. For this, in principle two methods can be used. The first consists in broadcasting the new transmission key to all decoders. The latter can then be updated so that as soon as the new key is used, they can decode the events. This type of update does not allow the exclusion of a cloned decoder since it can also receive the update messages since it disposes of the relevant deciphering keys.

Given that each security module includes at least one unique key, the second approach consists in transmitting the new transmission key in a message encrypted by this unique key. In this case, the number of messages is at least equal to the number of security modules installed in order to renew this transmission key individually. It is known that if a module is disabled, (that is to say if the host apparatus is not supplied), it will not receive such a message and can no longer offer to the user the services to which s/he would have a legitimate right when the host apparatus is powered on. In order to avoid this situation, during the sending of a message to a module, this message is repeated many times in order to be sure that it has been received correctly by its recipient.

Due to the limited bandwidth available and in order to ensure that each subscriber has received the new key, it is necessary to transmit the message before this new key is used, for example one month in advance, each message being repeated at different time during the day.

Henceforth, the owner of a clone module will request the new transmission key from the technician who has provided him/her with such a clone and who disposes of means for extracting the new transmission key from an authentic module. Once the key has been supplied, for example on the Internet, all the clones can then be updated before the new key is activated. In this way, the clones always remain operational.

As a result, the sending of transmission keys both by global or individual transmission presents drawbacks that do not allow the elimination of a cloned module.

BRIEF DESCRIPTION OF THE INVENTION

The aim of the present invention is to resolve the problem related to the inefficient use of bandwidth in asymmetrical encryption schemes while at the same time preserving the advantage of traceability associated with such schemes.

A system is therefore proposed comprising at least two security modules, each security module comprising at least:
  a first decryption module to decrypt a first stream using a pseudo-asymmetric decryption key, said first stream being common to all said security modules and being encrypted under a pseudo-asymmetric encryption key, and
  a second decryption module to decrypt a second stream using the output of the first decryption module, said second stream being common to all said security modules and being encrypted under a symmetric encryption key,
wherein said pseudo-asymmetric decryption key is different for each of said security modules, the output of each of said first decryption modules being identical for all said security modules.

By virtue of the traceability thus afforded by the encryption scheme of the present invention, the invention further aims to provide a solution to the abusive use of conditional access data, in particular by means of clones of security modules whose security has been compromised, by revoking security modules which have been used in such a fraudulent manner and their associated clones whenever they are detected. This aim is achieved by means of a revocation method for security modules intended to receive revocation messages broadcast to a plurality of security modules, said security modules comprising at least one personal key, this method comprising the steps, prior to revocation:
  division of the set of security modules into at least two groups,
  determination for each group of a pseudo-asymmetric key comprising a public key and a plurality of different private keys,
  loading of one private key per security module,
  preparing, in view of broadcasting, of one security message per group, said message being encrypted by the public key of said group;
revocation consisting of the following steps:
  sending to each member of the same group for which the security module is to be revoked, with the exception of the security module(s) to be revoked, of a new private key corresponding to the public key of another group, each private key being encrypted by the personal key of said security module.

An example of the generation of such pseudo-asymmetric keys uses the Boneh-Franklin system (Dan Boneh, Matthew K. Franklin: An Efficient Public Key Traitor Tracing Scheme. CRYPTO 1999: 338-353). From a public key, it is possible to generate a plurality of private keys, each allowing the decryption of a message encrypted by the public key.

This allows a different key to be placed in each security module by sending a limited number of different messages.

The invention is of particular interest in the domain of audio/video broadcasting and can be applied to either fixed systems such as the traditional TV set with set top box using some kind of broadcasting standard such as for example or it can be applied to hand-held systems employing such standards as DVB-H or MediaFLO for example.

BRIEF DESCRIPTION OF THE DRAWINGS

The invention will best be understood by reference to the following detailed description of a preferred embodiment when read in conjunction with the accompanying drawings, wherein.

DETAILED DESCRIPTION

In the field of the broadcasting, especially in Pay-TV, in order to be able to view an event such as a film, a sports event or a game, a broadcast signal comprising a plurality of streams is broadcast to a plurality of multimedia units. These streams include the event itself, usually in enciphered format, known as a data stream. The plurality of streams further includes at least one control message stream and may include at least one authorisation message stream. Control messages and authorisation messages are both also referred to as security messages. The security messages are prepared and sent from a management centre CG to a plurality of multimedia units STB. For the broadcast of the security messages we are faced with a trade-off between the global addressing, i.e. the same message for all the units, and the individual addressing, i.e. a message for each unit.

Figure 7:
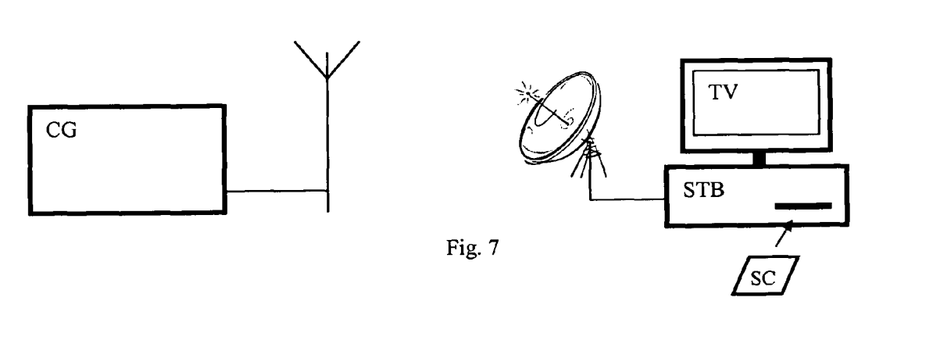

The management centre CG sends the security messages to the multimedia units STB. These units STB comprise security means in the form of a security module SC, illustrated in FIG. 7 by a plug-in smart card.

In the first case, the system is fast because only one message allows, for example, the transmission key to be changed. This is the key that encrypts the messages containing the control words cw.

It is possible to imagine the consequences of the second case as it must regularly transmit information to each security module, thereby impacting on the efficiency in the use of bandwidth.

The present invention provides a solution to the problem of bandwidth usage mentioned above by using an encryption scheme such as that described by Boneh and Franklin or another similar scheme, to have a pseudo-asymmetric encryption key arrangement whereby one public encryption key corresponds to a plurality of private decryption keys. Furthermore, each of the private decryption keys is unique, thus allowing them to be traceable. This leads to the advantage of being able to transmit one common encrypted broadcast signal to a plurality of receivers, thus realizing the gain in bandwidth efficiency typical of a symmetric encryption scheme, while retaining the advantage of traceability inherent in an asymmetric encryption scheme due to the use of a unique decryption key for each receiver. A receiver in this context is generally a multi-media unit (STB) comprising a security module (SC), while the transmissions are made by a management centre (CG) otherwise known as an operator. The security module comprises one or more decryption modules. The present invention can be applied, but is not limited, to the Pay-TV and other digital media distribution systems, such as CDs and DVDs. A public encryption key is used by the operator to encrypt a control message to be broadcast to a plurality of receivers while each receiver comprises a corresponding unique private traceable key which allows for the decryption of the encrypted broadcast control message. The private decryption key is preferably stored in the security module, which could be in the form of a SIM module connector, smartcard or any type of secure module with a tamper-proof memory.

Figure 1:
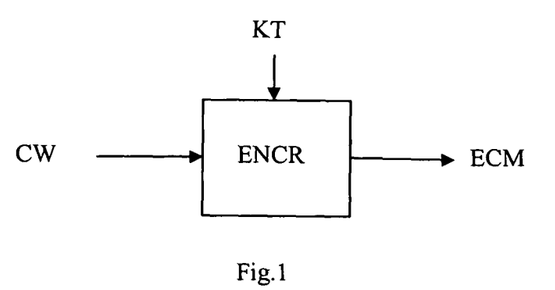
FIG. 1 shows a standard method for generating entitlement control messages in the domain of Pay-TV.

According to a standard practice in the Pay-TV domain, a content to be broadcast is scrambled under control words (CW) and the control words are encrypted (ENCR) under a transmission key (KT) to form entitlement control messages (ECM) as shown in FIG. 1. The scrambled content and the ECMs are then broadcast. Authorised receivers, i.e. receivers which have access to the transmission key (KT), can then decrypt the ECMs to reveal the control words therefore allowing for the content to be unscrambled. The transmission key can be of symmetric type, where the same key is used to encrypt and to decrypt, or it can be of asymmetric type, where a different key is used to encrypt and to decrypt. In the case of the asymmetric type a different encryption key per intended receiver may be employed.

The system described above amounts to a system of "decryption by key". The present invention may also employ a system of "decryption by rights", in which the simple possession of the transmission key (KT) does not suffice to be able to decrypt the ECMs. In this system the security module needs to have the proper rights to decrypt before the decryption is allowed. The rights can be proffered upon a security module via a further type of security message known as entitlement management messages (EMM), received from the management centre. EMMs are authorisation messages and can be uniquely addressable to one security modules or to a group of security modules, so that rights may attributed to security modules on a group by group basis or even individually. A security module's rights are verified before allowing the decryption of the ECMs to go ahead.

Figure 2:
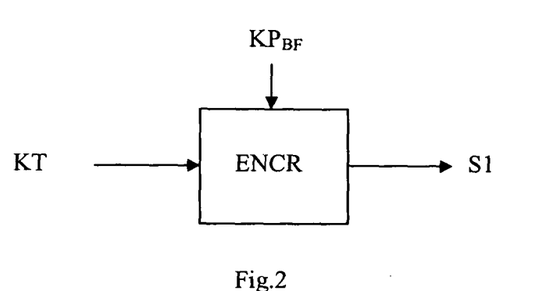
FIG. 2 schematically represents the encryption of an encryption key under a Boneh-Franklin type encryption scheme.

According to an embodiment of the present invention, a broadcast signal comprises a data stream and two control message streams. The data stream comprises the content scrambled under control words (CW), as is the standard practice. Furthermore, the transmission key (KT), which is used to generate ECMs from the control words (CW) as in the standard practice, is encrypted using a scheme such as that described by Boneh and Franklin or another similar scheme, to give the first of said two control message streams (S1). This encryption is done using a public key ($KP_{BF}$) as shown in FIG. 2. Thus the first control message stream comprises the transmission key encrypted under the public key of the pseudo-asymmetric Boneh-Franklin type encryption scheme. The second of the two control message streams comprises the ECM control messages which are generated in the standard way using the transmission key (KT).

Figure 3:
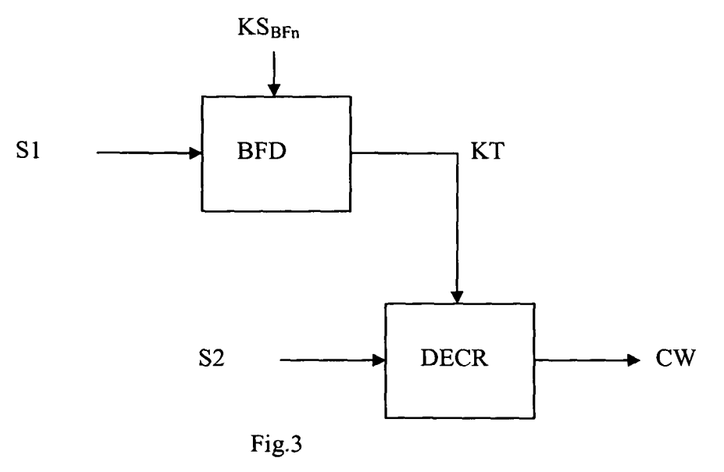
FIG. 3 shows a block diagram of the present invention

Each receiver parses the broadcast signal in order to isolate the various streams contained therein i.e. the data stream, the first control message stream and the second control message stream. Each receiver comprises a first decryption module (BFD) which functions according to a Boneh-Franklin type encryption scheme and is in possession of its unique secret traceable decryption key ($KS_{BFn}$), i.e. personal key corresponding to said public key ($KP_{BF}$), see FIG. 3. Using the unique secret traceable decryption key ($KS_{BFn}$) the receiver can then decrypt the first control message stream (S1) thereby extracting the transmission key (KT). Each receiver, using its own secret traceable key ($KS_{BFn}$), even if it is unique, decrypts the same common transmission key (KT) from the first control message stream (S1), which was generated using one common public key ($KP_{BF}$). Each receiver further comprises a second decryption module (DECR) and is therefore able to decrypt the second control message stream (S2), comprising the ECMs, using the output (KT) of the first decryption module (BFD) as a decryption key, thus yielding the control words (CW).

Figure 4:
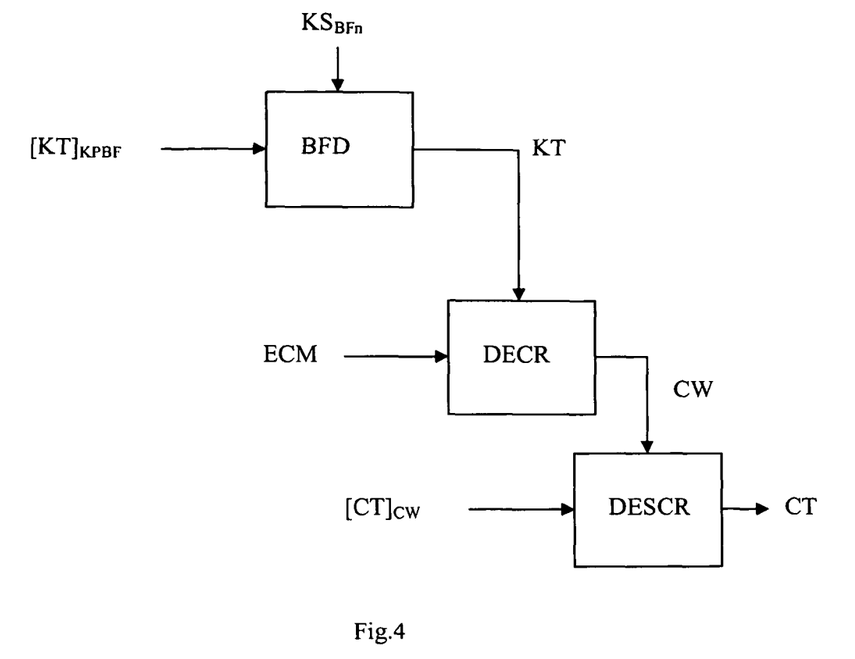
FIG. 4 shows one embodiment of the present invention

FIG. 4 shows the embodiment described above in more detail. The figure shows a case of a receiver in which the data stream and the control message streams have already been parsed from a received broadcast signal. The transmission key (KT), encrypted under a common public key as part of a Boneh-Franklin type encryption scheme, is received by a plurality of receivers in a first control message stream ($[KT]_{KPBF}$). Each receiver decrypts the first control message stream using a first decryption module (BFD) with its unique traceable Boneh-Franklin type decryption key to give the transmission key (KT). Entitlement control messages, comprising control words (CW) encrypted under the transmission key (KT) are received by the plurality of receivers in a second control message stream (ECM). Each receiver decrypts the control words (CW) using a second decryption module (DECR) with the transmission key (KT) which was decrypted using the first decryption module. The data stream, comprising scrambled content ($[CT]_{CW}$), is received by the plurality of receivers and is subsequently descrambled by each receiver using a third decryption module (DESCR) with the decrypted control words (CW) as descrambling keys to give the content in clear (CT).

It is worth noting that in the above description the first and second control message streams each comprise a plurality of data units. The flow rates of the data units in the two control message streams need not be the same and indeed are usually different. According to a first embodiment, the first decryption module processes a data unit which yields the transmission key. This key is valid for a first period during which it will be applied to a plurality of data units in the second control message stream, thus yielding a plurality of ECMs for example. As a consequence, the result of the processing of a single data unit by said first decryption module is used as input to said second decryption module for the processing of multiple contiguous data units from said second control message stream.

Figure 5:
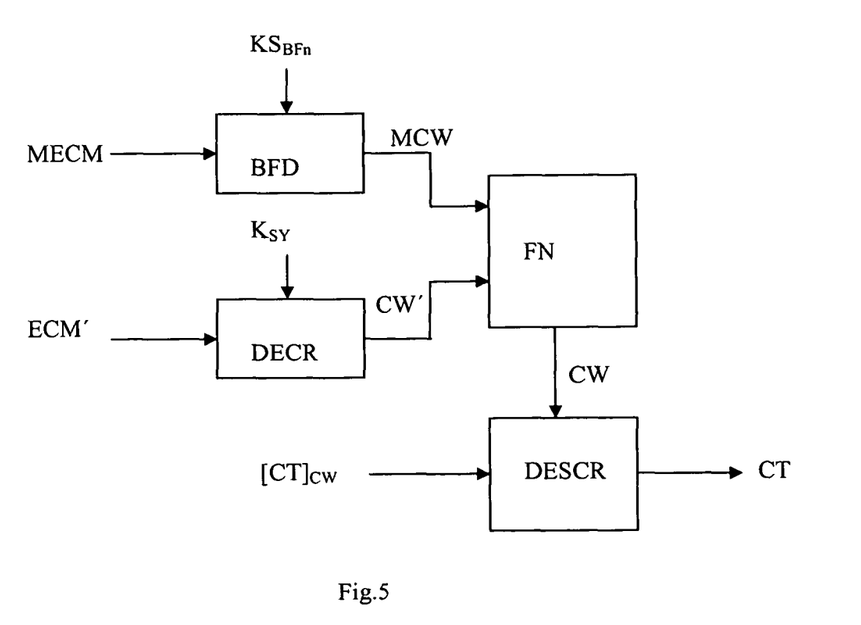
FIG. 5 shows another embodiment of the present invention using a master control word arrangement

According to another embodiment of the invention, shown in FIG. 5, the first control message stream (MECM) comprises a master control word (MCW) encrypted under the public key ($KP_{BF}$) of the Boneh-Franklin type encryption scheme. The second control message stream (ECM') comprises a control string (CW') encrypted under a symmetric key ($KS_Y$). The data stream comprises content scrambled under control words (CW). As well as the first decryptor (BFD) to decrypt the first control message stream (MECM), the second decryptor (DECR) to decrypt the second message stream (ECM') and the third decryptor (DESCR) to descramble the data stream ($[CT]_{CW}$), the receiver further comprises a cryptographic unit (FN) to combine the decrypted first control message (MCW) and the decrypted second control message (CW') using a logic function to give the control words (CW)). The logical function could be for example an exclusive-or function. The receiver has access to its unique secret traceable key ($KS_{BFn}$) to decrypt the first control message stream and the symmetric key ($K_{SY}$) to decrypt the second control message stream. MCW and CW' are combined in the cryptographic unit (FN) to give the control words (CW), thus allowing for the content to be descrambled (CT).

Figure 6:
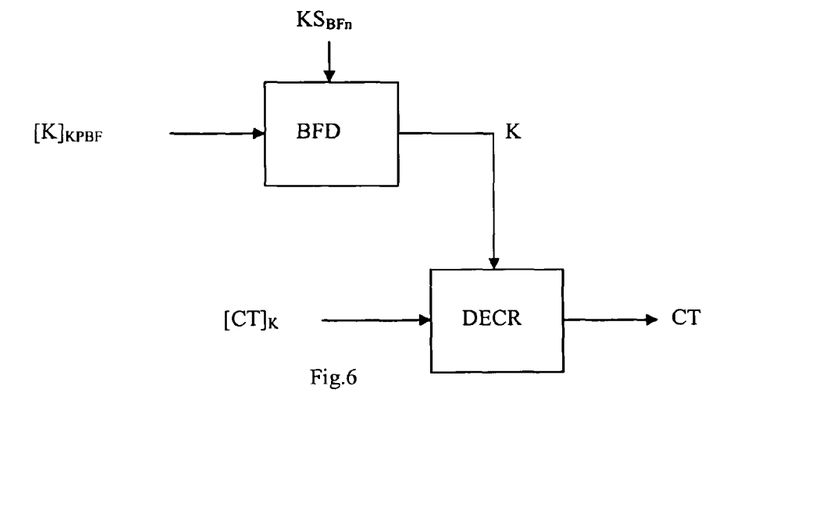
FIG. 6 shows yet a further embodiment of the present invention using one control message stream FIG. 7 schematically shows a transmitter and a Pay-TV receiver.

In yet another embodiment of the present invention, FIG. 6, the broadcast signal comprises one control message stream and a data stream. A content key (K) is encrypted under a public key (KPBF) by the operator according to a Boneh-Franklin type encryption scheme and broadcast in the broadcast signal as the control message stream ($[K]_{KPBF}$) to a plurality of receivers. A receiver's first decryption module (BFD) decrypts the content key (K) from the control message stream ($[K]_{KPBF}$) using its unique traceable decryption key ($KS_{BFn}$), which is one of a plurality of possible secret keys usable for the decryption of the control message stream according to the Boneh-Franklin type encryption scheme. The data stream ($[CT]_K$), comprising content scrambled using the content key, is unscrambled by the receiver in a second decryption module (DECR) using the decrypted content key (K) thus yielding the content (CT) in clear.

The advantage brought about by the present invention is that efficient use of bandwidth can be obtained since the control words (CW) need only be encrypted under one key, whereas in a typical asymmetrical encryption system the control words (CW) have to be encrypted under the several public keys before broadcasting in order for each receiver to be able to decrypt with its unique private key. In the present invention only one encryption is done on the control words, thanks to the pseudo-symmetric encryption of a further control message, which uses a single encryption key corresponding to a plurality of private keys. At the same time, since each receiver decrypts with a unique, traceable key, this allows for traitor tracing capability.

In another embodiment of the present invention, it is possible to take advantage of the tracing possibilities afforded by the pseudo-asymmetric encryption scheme described above to exclude possible clones and their respective compromised security modules from being able to decrypt further transmissions. This is achieved by dividing the set of security modules into groups, each group being able to contain several hundreds of modules. According to one variant, each group includes 256 members. Therefore, 1 million subscribers represent approx. 4000 groups, thus 4000 messages to renew the transmission key or to update a security programme.

At the time of the personalisation of a security module, the secret keys pertaining to each module are loaded. Each security module carries an identification number UA that will allow the secret keys introduced into a module to be traced.

The management centre CG disposes of a database with the list of personal keys for each security module.

The management of modules into groups can be carried out either during the personalisation of the module (in general before delivery) or on site during start-up. According to our invention, a key or a piece of information is necessary to access services controlled by the management centre. This can be an independent and supplementary step to the management of the rights. The fact that the key or the information is accessible to all the security modules does not mean that the services are accessible to subscribers using these security modules.

As previously indicated, a security module is assigned to a group, for example the group GrA. This assignation can be made either at the time of the initialisation of the module, or by sending the personal private key corresponding to the group GrA. The sending of this key is protected by the encryption of said key by one of the personal keys of the security module. According to the example in FIG. 8, the security modules SC1A, SC2A and SC3A are part of this group GrA. The secret information is encrypted by the key KGrA in the management centre CG and deciphered by each private key of the security modules. This is made possible thanks to the use of the pseudo-asymmetric encryption scheme employed in the present invention wherein one encryption key corresponds to a plurality of decryption keys.

Figure 8:
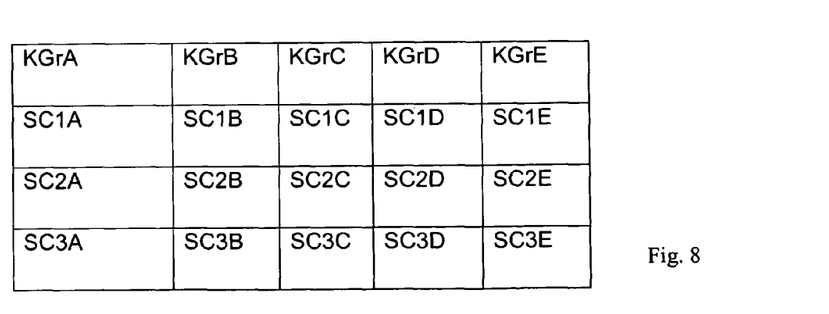
FIG. 8 shows the distribution into 4 groups each comprising 3 security modules.

In the same way, other groups GrB, GrC or GrD also comprise security modules SC . . . B, SC . . . C or SC . . . D.

Therefore, the set of security modules receives the secret information necessary for the correct working of the conditional access system by sending as many different messages as there are groups. It is to be noted that the repetition of the messages is not avoided in the case where the receiver has no return channel. The management center will repeat the messages according to a predefined schedule, e.g. one per day at different time randomly selected.

At the time of the detection of a security module clone, for example, if such a module has been compromised by the extraction of the keys, the personal private key will be found in all the clones.

Once a clone is known, it is possible to determine which security module has been compromised by comparing the private key of this clone module with the private keys stored in the management centre. The management centre keeps a copy of the private key loaded into each security module. According to our example, the module to be revoked is the module SC1A. The group GrA will thus disappear as it is no longer possible to send secret messages encrypted by means of the public key KGrA. Before stopping the sending of the messages encrypted by the group key KGrA, all the security modules, with the exception of corrupted security module, must change group.

Figure 9:
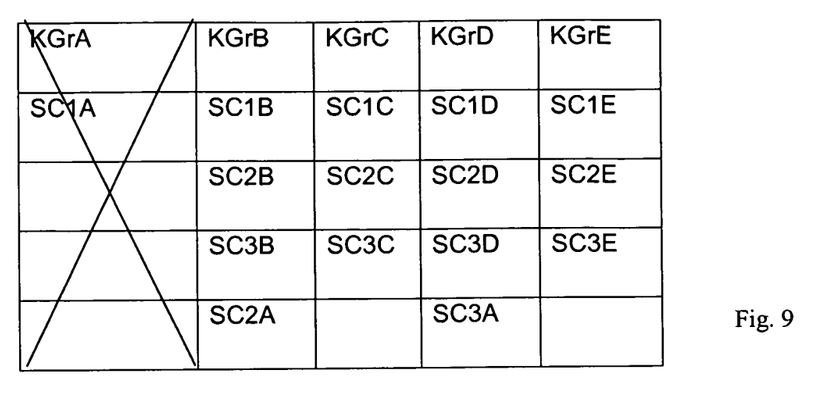
FIG. 9 shows the distribution of the groups after the revocation of a security module.

In the example in FIG. 9, the security module SC2A is moved into group B, the module SC2A is moved to group D. This operation is carried out by sending the group key of its new membership. This group key is encrypted by a personal key of the security module so that this message can only be interpreted by the security module concerned. Once the uncorrupted members have been removed from the compromised group, the sending of messages with group key A is interrupted. At this moment, all the clones cease to be operational as they can no longer receive the secret information.

The moving of the members not revoked towards other groups can be carried out either towards other existing groups, or by the creation of a new group.

The assignment of membership to a group is carried out as indicated by the presence of a unique private key generated in a pseudo-asymmetric system with a public key and a plurality of private keys. According to another embodiment, a group identifier is also transmitted so as to filter the messages pertaining to this group from other groups. The secret information is encrypted by the public key of said group, and the group identifier is added to said message. This allows to decrypt a message and to realize that the content of same is random, due to the use of the wrong key. The group identifier is preferably tested by the host apparatus which has received this identifier from the security module. A security message is transmitted to the security module only if it contains the same identifier of the security module.

The secret information can take several forms. The document WO0156287 describes a method to combine information in order to obtain the control word. The secret information could either be the master control word that will be combined with the control words CW contained in the control messages, or the key for decrypting a message containing the master control word.

Another form of secret information has the form of a transmission key. This key is used for decrypting the control messages ECM and extracting the control words. This transmission key is changed every month, for example.

In practice, for example during a transmission key change, the sending of the new key to all the security modules can take time. The security modules will thus dispose of two pieces of secret information, one current and another ready to take over. In the case of the transmission key, the header of the control message will contain an indication to show which transmission key is to be used. A simple system is to define an even transmission key and an odd transmission key. The control message ECM will contain a bit to define parity and thus the key to be used.

In order to avoid giving ill-intentioned third parties time to find the secret piece of information, provision is made according to one variant of the invention to encrypt the secret piece of information by means of a release key. This key is global and is used regardless of the group of the security module. Therefore each security module will receive a message encrypted by the key of its group and encrypted by a global key. It is also possible to send a release message with the release key encrypted by the global key and additionally encrypted by the group key.

Shortly before the activation of the secret piece of information, for example the transmission key, the management centre CG sends a message containing the global key, encrypted according one of the embodiment described above. At this moment, each module will be capable of disposing of the secret piece of information thus allowing it to process the corresponding security data.

The invention claimed is:

1. A system for providing access to scrambled content comprised within a broadcast signal, the system comprising:
at least two receivers for receiving the broadcast signal, the broadcast signal comprising a plurality of streams, each receiver including a security module and,
a first decryption module to decrypt a first stream from the plurality of streams using a pseudo-asymmetric decryption key to produce an output, the pseudo-asymmetric decryption key being stored in the security module, said first stream being common to all said receivers and being encrypted under a pseudo-asymmetric encryption key, and
a second decryption module to decrypt a second stream from the plurality of streams using the output of the first decryption module, said second stream being common to all said receivers and being encrypted under a symmetric encryption key,
wherein said pseudo-asymmetric decryption key is different for each of said security modules, each different pseudo-asymmetric decryption key corresponding to the pseudo-asymmetric encryption key, the output of each of said first decryption modules being identical for all said receivers, the system thereby providing traceability of at least one of the receivers.

2. The system according to claim 1, wherein said pseudo-asymmetric decryption key allows for its associated security module to be uniquely identified.

3. The system according to claim 2, wherein at least one of the receivers further includes,
a third decryption module to descramble a third stream comprising scrambled content and wherein said second stream comprises at least one encrypted control word, said encrypted control word being decrypted by said second decryption module and used by said third decryption module to descramble the third stream.

4. The system according to claim 2, wherein said first stream and said second stream each include a plurality of data units, each of said data units being processed one at a time by said first decryption module and said second decryption module, wherein the result of the processing of a single data unit by said first decryption module is used as input to said second decryption module for the processing of multiple contiguous data units from said second stream.

5. The system according to claim 2, wherein said pseudo-asymmetric decryption key is stored in a tamper-proof memory.

6. The system according to claim 2, wherein the second stream includes the scrambled content and the second decryption module is configured to provide unscrambled content.

7. The system according to claim 1, wherein at least one of the receivers further includes,
a third decryption module to descramble a third stream including scrambled content and wherein said second stream comprises at least one encrypted control word, said encrypted control word being decrypted by said second decryption module and used by said third decryption module to descramble the third stream thereby providing unscrambled content.

8. The system according to claim 7, wherein said first stream and said second stream each include a plurality of data units, each of said data units being processed one at a time by said first decryption module and said second decryption module, wherein the result of the processing of a single data unit by said first decryption module is used as input to said second decryption module for the processing of multiple contiguous data units from said second stream.

9. The system according to claim 7, wherein said pseudo-asymmetric decryption key is stored in a tamper-proof memory.

10. The system according to claim 1, wherein said first stream and said second stream each include a plurality of data units, each of said data units being processed one at a time by said first decryption module and said second decryption module, wherein the result of the processing of a single data unit by said first decryption module is used as input to said second decryption module for the processing of multiple contiguous data units from said second stream.

11. The system according to claim 10, wherein said pseudo-asymmetric decryption key is stored in a tamper-proof memory.

12. The system according to claim 1, wherein said pseudo-asymmetric decryption key is stored in a tamper-proof memory.

13. The system according to claim 1, wherein the second stream includes the scrambled content and the second decryption module is configured to provide unscrambled content.

14. A method for broadcasting at least two encrypted streams to be decrypted by at least two receivers each receiver including a security module and at least two decryption modules, said method comprising the following steps:

encrypting a symmetric encryption key under a pseudo-asymmetric encryption key;

broadcasting a first stream comprising said encrypted symmetric encryption key to the plurality of security modules;

broadcasting a second stream encrypted under the symmetric encryption key to the plurality of security modules, wherein a first of said security module includes a first pseudo-asymmetric decryption key corresponding to said pseudo-asymmetric encryption key and a second security module includes a second pseudo-asymmetric decryption key, both pseudo-asymmetric decryption keys corresponding to said pseudo-asymmetric encryption key wherein each of said first and second pseudo-asymmetric decryption keys is unique and wherein a first of said at least two decryption modules uses the first pseudo-asymmetric decryption key to decrypt the first stream and the second of said at least two decryption modules uses the output of the first decryption module as a decryption key to decrypt the second stream.

15. The method according to claim 14 wherein:

said decrypted second stream is a control word and, a third stream comprising a content encrypted under said control word is broadcast to said plurality of security modules, and said security modules comprise a third decryption module to decrypt said third stream using said decrypted second stream to give decrypted content.

16. The method according to claim 14 wherein said second stream comprises an encrypted content.

17. The method according to claims 14 wherein said method allows for the revocation of at least one of said security modules, said method comprising the following steps:

assigning the plurality of security modules to one of a plurality of groups, attributing a different private key to each of said groups, all of said private decryption keys corresponding to one public key, said private keys and public key forming a set of keys pertaining to a pseudo-asymmetric encryption scheme, loading one private key per first decryption module per security module, said private key being that which has been attributed to the group to which said security module has been assigned, transmitting one security message per group, said security message being encrypted by the public key of said group, said revocation comprising the following step:

transmitting a new private key to each member of the same group as the security module to be revoked, with the exception of the security module to be revoked, said new private key being encrypted by the personal key of said security module.

18. The method according to claim 17 used in a pay-TV system in which an audio/video stream is encrypted by control words, said control words being encrypted by a transmission key and transmitted in the form of control messages, wherein said security messages comprise a transmission key allowing for the decryption of the control messages.

19. The method according to claim 17 used in a pay-TV system in which an audio/video stream is encrypted by control words, said control words being encrypted by a transmission key and transmitted in the form of control messages, wherein said security messages comprise a master encryption key allowing for the decryption of the control words.

20. The method according to claim 17 in which the security modules contain a common key, wherein the content of the security message is over-encrypted by a release key, said release key is encrypted by the common key of the security modules and is transmitted shortly before the activation of the content of the security message.

21. The method according to claim 17, wherein the members of a revoked group are reassigned to different existing groups, with the exception of the security module to be revoked.

22. The method according to claim 17, wherein the members of a revoked group are reassigned to a new group, with the exception of the security module to be revoked.

* * * * *